(12) United States Patent
Morrison, Jr. et al.

(10) Patent No.: US 7,643,796 B2
(45) Date of Patent: Jan. 5, 2010

(54) SYSTEM AND METHOD FOR PROCESS CONTROL USING WIRELESS DEVICES WITH MULTIPLE TRANSCEIVERS AND AT LEAST ONE PROCESS ELEMENT

(75) Inventors: Donald A. Morrison, Jr., Tempe, AZ (US); Christopher J. Webb, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 618 days.

(21) Appl. No.: 11/402,677

(22) Filed: Apr. 12, 2006

(65) Prior Publication Data
US 2007/0242629 A1 Oct. 18, 2007

(51) Int. Cl.
*H04B 7/00* (2006.01)
*H04B 7/14* (2006.01)
*H04B 17/00* (2006.01)
*G08B 1/08* (2006.01)
*G08C 17/02* (2006.01)

(52) U.S. Cl. ............... 455/41.2; 455/66.1; 455/67.11; 340/539.1; 340/870.01

(58) Field of Classification Search ............ 370/310, 370/335; 455/418–420
See application file for complete search history.

(56) References Cited

U.S. PATENT DOCUMENTS

| | | | |
|---|---|---|---|
| 5,724,655 A * | 3/1998 | Grube et al. ............ 455/419 |
| 6,229,448 B1 | 5/2001 | Bennett, Jr. et al. |
| 6,236,334 B1 | 5/2001 | Tapperson et al. |
| 6,967,589 B1 * | 11/2005 | Peters .................... 340/853.2 |
| 2001/0047383 A1 | 11/2001 | Dutta |
| 2002/0027504 A1 | 3/2002 | Davis et al. |
| 2002/0127447 A1 * | 9/2002 | Edlund et al. ................ 429/19 |
| 2005/0047330 A1 | 3/2005 | Tapperson et al. |
| 2005/0049727 A1 * | 3/2005 | Tapperson et al. ............ 700/19 |
| 2005/0062677 A1 | 3/2005 | Nixon et al. |
| 2005/0130605 A1 * | 6/2005 | Karschnia et al. .......... 455/90.3 |
| 2005/0222691 A1 | 10/2005 | Glas et al. |
| 2006/0203877 A1 * | 9/2006 | Heyman et al. ............. 374/117 |
| 2007/0171036 A1 * | 7/2007 | Nordmeyer ............... 340/539.1 |
| 2007/0227187 A1 | 10/2007 | Coward |
| 2007/0242690 A1 | 10/2007 | Raghavendra et al. |

FOREIGN PATENT DOCUMENTS

| | | |
|---|---|---|
| EP | 1128244 A2 | 8/2001 |
| EP | 1 202 145 A1 | 5/2002 |
| WO | WO 01/35190 A2 | 5/2001 |
| WO | WO 2004/053604 A1 | 6/2004 |

* cited by examiner

*Primary Examiner*—Nick Corsaro
*Assistant Examiner*—Tangela T. Chambers
(74) *Attorney, Agent, or Firm*—Munck Carter, LLP

(57) ABSTRACT

An apparatus includes at least one process element and a first transceiver configured to communicate with the at least one process element. The apparatus also includes a second transceiver configured to communicate wirelessly with the first transceiver and to communicate with a process control system. The process control system may transmit data to the at least one process element via the first transceiver and the second transceiver. The process control system may also receive data from the at least one process element via the first transceiver and the second transceiver.

20 Claims, 3 Drawing Sheets

SYSTEM AND METHOD FOR PROCESS CONTROL USING WIRELESS DEVICES WITH MULTIPLE TRANSCEIVERS AND AT LEAST ONE PROCESS ELEMENT

TECHNICAL FIELD

This disclosure relates generally to process control systems and more particularly to a system and method for process control using wireless devices.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Advanced control and optimization techniques are typically limited by the amount and quality of information that can be provided to a control application. Often, more or higher quality information can be provided to the control application if additional instrumentation is added to a control system. However, tradeoffs in control fidelity versus cost are often made as a result of the high overhead associated with the addition of hardwired instrumentation. In turn, some critical economic aspects, not necessarily related to robustness of control, are left out of the control optimization problem, resulting in suboptimum economic situations.

Additionally, in some typical cases, information must be inferred via complex calculations or otherwise because direct observation using typical instrumentation is impractical or impossible. In short, because of the lack of operational information, true process optimization often cannot be achieved even when advanced control strategies are employed.

SUMMARY

This disclosure provides a system and method for process control using wireless devices.

In a first embodiment, an apparatus includes at least one process element and a first transceiver configured to communicate with the at least one process element. The apparatus also includes a second transceiver configured to communicate wirelessly with the first transceiver and to communicate with a process control system.

In particular embodiments, the process control system transmits data to the at least one process element via the first transceiver and the second transceiver. In other particular embodiments, the process control system receives data from the at least one process element via the first transceiver and the second transceiver.

In yet other particular embodiments, the apparatus also includes at least one second process element and a third transceiver configured to communicate with the at least one second process element. The second transceiver is also configured to communicate wirelessly with the third transceiver.

In a second embodiment, a process control system includes at least one controller and at least one process element capable of being controlled by the at least one controller. The system also includes a first transceiver configured to communicate with the at least one process element and a second transceiver configured to communicate wirelessly with the first transceiver. The second transceiver is also configured to communicate with the at least one controller.

In a third embodiment, a method includes receiving data from at least one process element at a first transceiver, wirelessly communicating the data to a second transceiver, and communicating the data from the second transceiver to a process control system. The method may also include receiving second data from the process control system at the second transceiver, wirelessly communicating the second data to the first transceiver, and communicating the second data from the first transceiver to the at least one process element.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
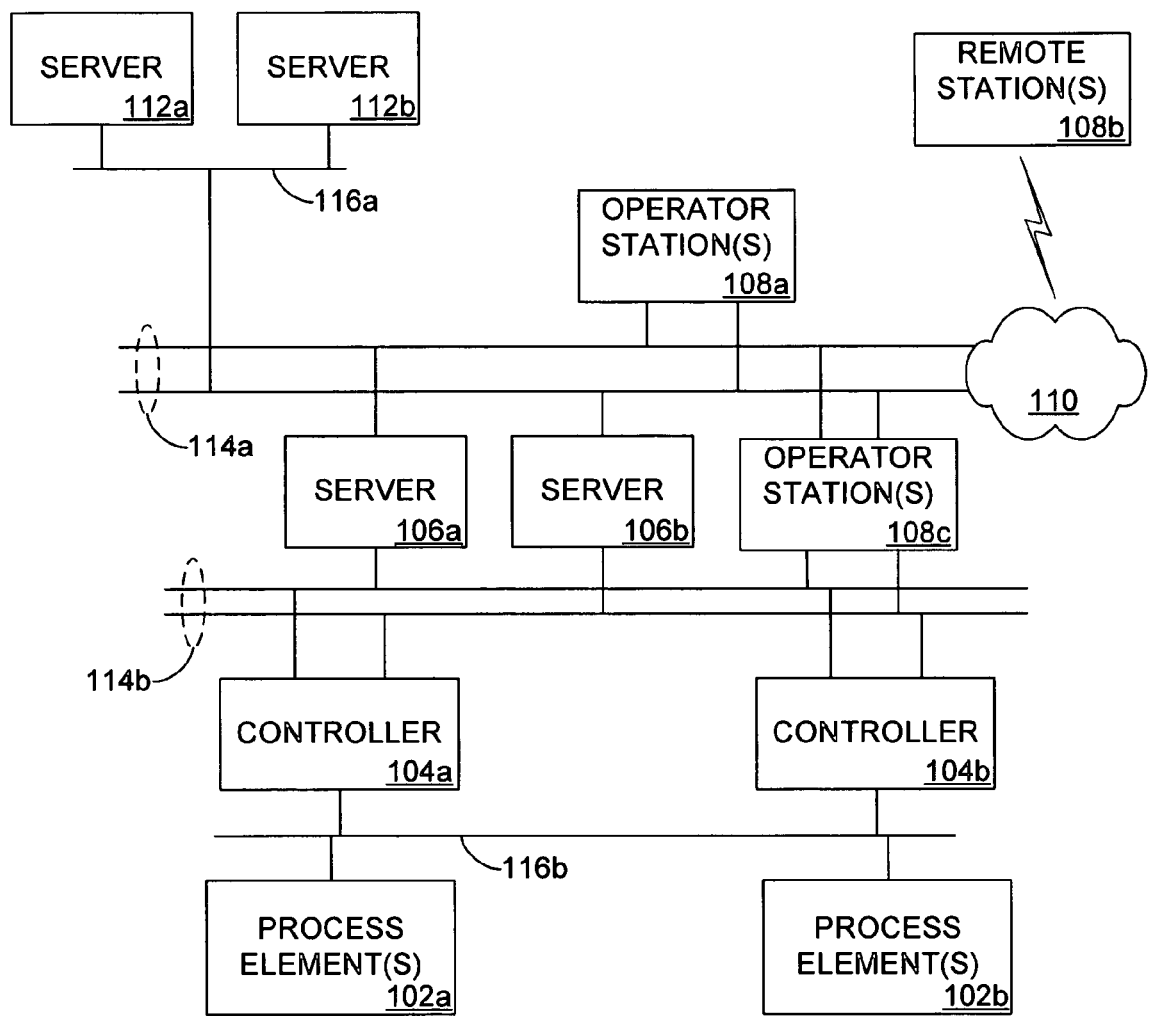
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system. While only two process elements 102a-102b are shown in this example, any number of process elements may be included in a particular implementation of the process control system 100.

Two controllers 104a-104b are coupled to the process elements 102a-102b. The controllers 104a-104b control the operation of the process elements 102a-102b. For example, the controllers 104a-104b could be capable of monitoring the operation of the process elements 102a-102b and providing control signals to the process elements 102a-102b. Each of the controllers 104a-104b includes any hardware, software, firmware, or combination thereof for controlling one or more of the process elements 102a-102b. The controllers 104a-104b could, for example, include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. The operator stations 108a-108c could, for example, represent personal computers having displays and processors executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 also includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks. The process control system 100 could have any other suitable network topology according to particular needs.

In one aspect of operation, one or more of the process elements 102a-102b may each include a wireless portion, as described in more detail below with reference to FIG. 2. The wireless portion of the process element allows its placement and use in a location where a conventional wired process element would be impractical, cost prohibitive, or even unusable. While only process element 102a is described below as including a wireless portion, any number of process elements in the process control system 100 can include a wireless portion.

Although FIG. 1 illustrates one example of a process control system 100, various changes may be made to FIG. 1. For example, a control system could include any number of process elements, controllers, servers, and operator stations.

Figure 2:
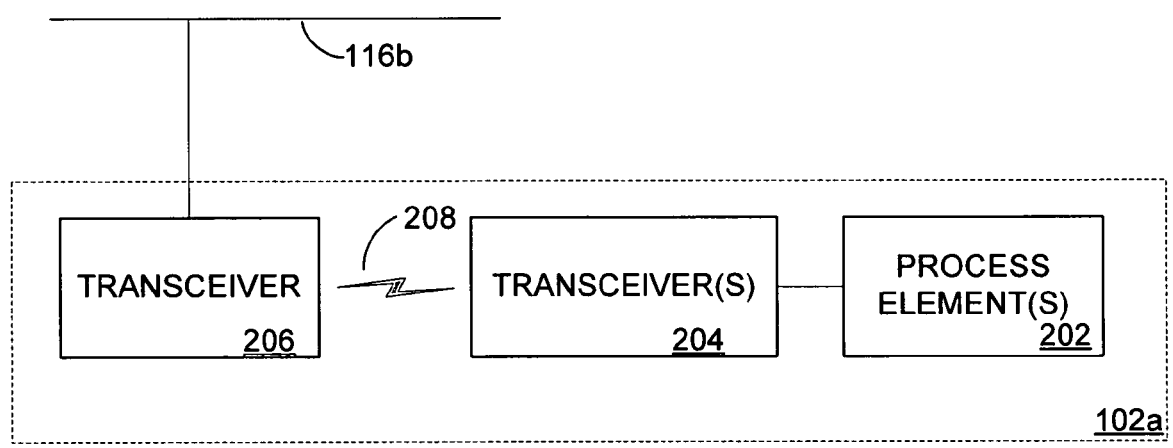
FIG. 2 illustrates an example process element including a wireless portion in a process control system according to one embodiment of this disclosure.

FIG. 2 illustrates an example process element 102a including a wireless portion in a process control system 100 according to one embodiment of this disclosure. The process element 102a illustrated in FIG. 2 is for illustration only. Other process elements could be used in a process control system without departing from the scope of this disclosure. Also, for ease of explanation, the process element 102a shown in FIG. 2 is described with respect to the process control system 100 of FIG. 1. The process element 102a shown in FIG. 2 could be used with any other suitable device or system.

In this example, the process element 102a includes one or more actual process elements 202 and a wireless portion formed by two transceivers 204 and 206, which communicate by a wireless link 208. The one or more process elements 202 could represent motors, catalytic crackers, valves, or other industrial equipment in a production environment. The process element 202 could represent any other or additional components in any suitable process or production system. Each process element 202 includes any hardware, software, firmware, or combination thereof for performing one or more functions in a process or production system.

In particular embodiments, a process element 202 includes monitoring instrumentation specially configured to operate in hostile environments, such as in extreme temperatures or pressures or in the presence of toxic substances. In many cases, these environments make typical hardwired instrumentation impractical or impossible to use.

The one or more process elements 202 are coupled to the transceiver 204. In some embodiments, a process element 202 is directly connected to the transceiver 204. In particular embodiments, the transceiver 204 is integrated with or into a process element 202. The transceiver 204 communicates over the wireless link 208 with the transceiver 206, which in turn communicates over the network 116b as described above. Depending on the implementation, the transceiver 204 may support uni-directional or bi-directional communication. For example, the transceiver 204 may be capable of transmission and not reception when no instructions or other data is to be sent to the process element 202.

The wireless link 208 can be implemented using any suitable wireless technology according to particular needs. Suitable wireless technologies may include, but are not limited to, analog and digital radio frequency (RF) signals, as well as particular protocols such as WiFi, Bluetooth, TDMA, CDMA, OFDMA, RFID, optical signaling, and others. The transceivers 204 and 206 can be implemented using any suitable transceiver technology consistent with the wireless technology required.

While the transceiver 204 may typically be located very close to the process element 202 or integrated with the process element 202, the transceiver 206 can be located as near or as far from the transceiver 204 as desired as long as the wireless link 208 is reliable. In many instances, the process element 202 and the transceiver 204 are battery-operated, and the transceiver 206 may be located as close as possible to the transceiver 204 in order to minimize transmission power consumption.

In some embodiments, the transceiver 206 is directly connected to the network 116b. In particular embodiments, the transceiver 206 is a dedicated transceiver or is implemented as part of a data processing system, a controller, or other device or system.

Wireless technology, coupled with advanced process control and optimization techniques, enables additional information to be provided to a controller or other device. This may provide better control fidelity without the high cost of installation associated with hardwired devices. It also allows the acquisition of sensor data from hazardous areas, such as where a wired installation would require a unit shutdown or in hot works. A system in accordance with this disclosure can yield process information from previously unattainable areas, such as the interior of a catalyst bed, and reduce or eliminate the need for complex calculations to infer the same information. Other implementations could include placing a process element inside a reactor to measure reactor close or inside distillation columns. Other benefits may include the ability to directly control parameters linked to process economics.

Although FIG. 2 illustrates one example of a process element 102a including a wireless portion in a process control system 100, various changes may be made to FIG. 2. For example, the transceiver 204 could be integrated into the process element 202. Also, the transceiver 206 could be configured to connect with one or multiple transceivers 204, where each transceiver 204 is associated with one or more process elements 202.

Figure 3:
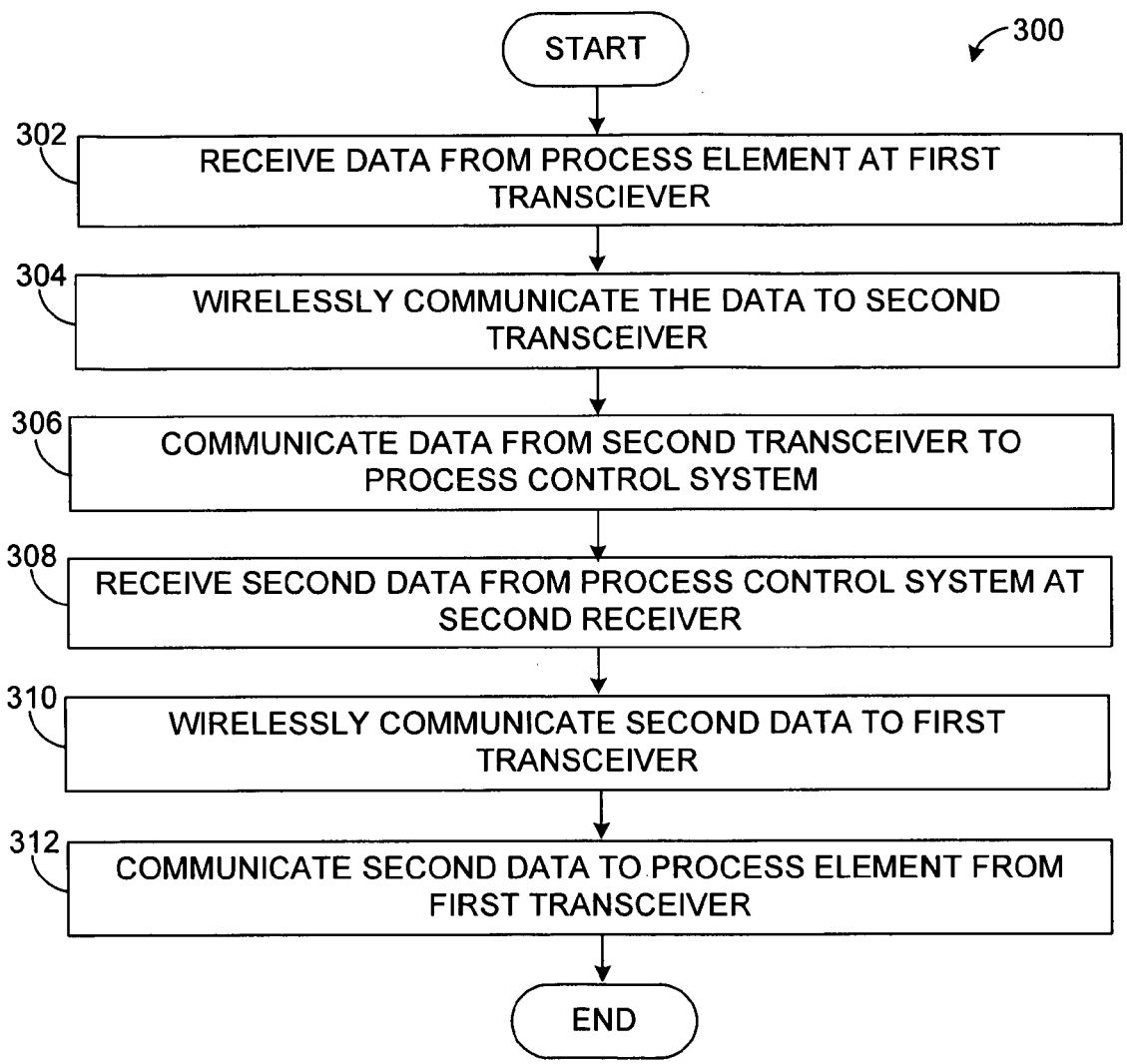
FIG. 3 illustrates an example method for process control using wireless devices according to one embodiment of this disclosure.

FIG. 3 illustrates an example method 300 for process control using wireless devices according to one embodiment of this disclosure.

Data is received from process element 202 at a transceiver 204 at step 302.

The data is wirelessly communicated to transceiver 206 from transceiver 204 at step 304.

The data is communicating from transceiver 206 to process control system 100, preferably by network 116b, at step 306.

Second data is received from the process control system 100 at transceiver 206 at step 308.

The second data is wirelessly communicated to the transceiver 204 from transceiver 206 at step 310.

The second data is communicated from transceiver 204 to process element 202 at step 312.

Although FIG. 3 illustrates one example of a method 300 for using wireless communications for process elements, various changes may be made to FIG. 3. For example, one, some, or all of the steps may occur as many times as needed. Also, while shown as a sequence of steps, various steps in FIG. 3 could occur in parallel or in a different order.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   at least one process element configured to measure at least one process variable associated with an industrial process being controlled;
   a first transceiver configured to communicate with the at least one process element; and
   a second transceiver configured to communicate wirelessly with the first transceiver;
   wherein the second transceiver is further configured to communicate with a process control system that is configured to control the industrial process, the process control system configurable to:
   (i) indirectly infer values of the at least one process variable based on measurements of at least one other process variable; and
   (ii) receive direct measurements of the at least one process variable taken by the at least one process element and provided by the second transceiver and control the industrial process using the direct measurements.

2. The apparatus of claim 1, wherein the process control system is configured to transmit data to the at least one process element via the first transceiver and the second transceiver.

3. The apparatus of claim 1, wherein the process control system is configured to receive data from the at least one process element via the first transceiver and the second transceiver.

4. The apparatus of claim 1, further comprising:
   at least one second process element; and
   a third transceiver configured to communicate with the at least one second process element, wherein the second transceiver is also configured to communicate wirelessly with the third transceiver.

5. The apparatus of claim 1, wherein the first transceiver is integrated into one of the at least one process element.

6. The apparatus of claim 1, wherein the at least one process element is configured to measure at least one condition of a reactor associated with a distillation tower.

7. The apparatus of claim 1, wherein the at least one process element is configured to measure at least one condition of a catalyst bed.

8. The apparatus of claim 1, wherein the second transceiver is configured to communicate with the first transceiver using one of: an analog radio frequency signal and a digital radio frequency signal.

9. The apparatus of claim 1, wherein multiple process elements are connected to the first transceiver.

10. A process control system, comprising:
   at least one process element configured to measure at least one process variable associated with an industrial process being controlled;
   at least one controller configured to control the industrial process, wherein the at least one controller is configured to utilize advanced process control and optimization techniques to control the industrial process;
   a first transceiver configured to communicate with the at least one process element; and
   a second transceiver configured to communicate wirelessly with the first transceiver, the second transceiver further configured to communicate with the at least one controller;
   wherein the at least one controller is configurable to:
      (i) indirectly infer values of the at least one process variable based on measurements of at least one other process variable; and
      (ii) receive direct measurements of the at least one process variable taken by the at least one process element and provided by the second transceiver and control the industrial process using the direct measurements.

11. The process control system of claim 10, wherein the at least one controller is configured to transmit data to the at least one process element via the first transceiver and the second transceiver.

12. The process control system of claim 10, wherein the at least one controller is configured to receive data from the at least one process element via the first transceiver and the second transceiver.

13. The process control system of claim 10, further comprising:
   at least one second process element; and
   a third transceiver configured to communicate with the at least one second process element, wherein the second transceiver is also configured to communicate wirelessly with the third transceiver.

14. The process control system of claim 10, wherein the first transceiver is integrated into one of the at least one process element.

15. The process control system of claim 10, wherein the first transceiver and the second transceiver are located such that a wired connection between them is not possible.

16. The process control system of claim 10, wherein the at least one process element is configured to measure at least one condition of a catalyst bed.

17. The process control system of claim 10, wherein the second transceiver is configured to communicate with the first transceiver using one of: an
   analog radio frequency signal and a digital radio frequency signal.

18. The process control system of claim 10, wherein multiple process elements are connected to the first transceiver.

19. A method, comprising:
   identifying a process variable associated with an industrial process being controlled by a process control system, wherein values of the identified process variable are indirectly inferred based on measurements of at least one other process variable taken by the process control system;
   placing at least one process element in the industrial process, the at least one process element configured to directly measure the identified process variable;
   coupling the at least one process element to a first transceiver;
   receiving data from the at least one process element at the first transceiver, the data comprising direct measurements of the identified process variable;
   wirelessly communicating the data to a second transceiver;
   communicating the data from the second transceiver to the process control system; and
   controlling the industrial process at the process control system using advanced process control and optimization techniques and the direct measurements of the identified process variable.

20. The method of claim 19, further comprising:
   receiving second data from the process control system at the second transceiver;
   wirelessly communicating the second data to the first transceiver; and
   communicating the second data from the first transceiver to the at least one process element.

* * * * *

UNITED STATES PATENT AND TRADEMARK OFFICE
CERTIFICATE OF CORRECTION

PATENT NO. : 7,643,796 B2  Page 1 of 1
APPLICATION NO. : 11/402677
DATED : January 5, 2010
INVENTOR(S) : Morrison, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this

Sixteenth Day of November, 2010

David J. Kappos
*Director of the United States Patent and Trademark Office*